US011988030B2

(12) United States Patent
Gstrein

(10) Patent No.: US 11,988,030 B2
(45) Date of Patent: May 21, 2024

(54) HINGE ASSEMBLY

(71) Applicant: Julius Blum GmbH, Hoechst (AT)

(72) Inventor: Florian Gstrein, Wolfurt (AT)

(73) Assignee: JULIUS BLUM GMBH, Hoechst (AT)

( * ) Notice: Subject to any disclaimer, the term of this patent is extended or adjusted under 35 U.S.C. 154(b) by 31 days.

(21) Appl. No.: 17/865,899

(22) Filed: Jul. 15, 2022

(65) Prior Publication Data

US 2022/0349228 A1 Nov. 3, 2022

Related U.S. Application Data

(63) Continuation of application No. PCT/AT2021/060015, filed on Jan. 14, 2021.

(51) Int. Cl.

*E05D 7/04* (2006.01)
*E05D 7/12* (2006.01)
(Continued)

(52) U.S. Cl.

CPC ......... *E05D 7/0415* (2013.01); *E05D 7/0423* (2013.01); *E05D 7/123* (2013.01); *E05D 5/065* (2013.01); *E05D 7/0407* (2013.01); *E05D 2007/0492* (2013.01); *E05D 2007/128* (2013.01); *E05F 3/20* (2013.01); *E05Y 2900/20* (2013.01)

(58) Field of Classification Search

CPC . E05D 2007/0492; E05D 7/04; E05D 7/0407; E05D 7/0415; E05D 7/0423; E05D 7/043; E05D 2007/0438; E05D 2007/0446; E05D 2007/0453; E05D 2007/0461; E05D 2007/0469; E05D 2007/0476; E05D 2007/0484; E05D 7/12; E05D 7/123; E05D 7/125; E05D 2007/126; E05D 2007/128; E05D 5/065

See application file for complete search history.

(56) References Cited

U.S. PATENT DOCUMENTS 4,800,622 A * 1/1989 Rock .................... E05D 7/0407 16/382
4,847,948 A * 7/1989 Gross ...................... E05D 7/125 16/370

(Continued)

FOREIGN PATENT DOCUMENTS

AT 006 964 6/2004
CN 110603366 12/2019

(Continued)

OTHER PUBLICATIONS

International Search Report dated Apr. 15, 2021 in International (PCT) Application No. PCT/AT2021/060015.

*Primary Examiner* — Jeffrey O'Brien

(74) *Attorney, Agent, or Firm* — Wenderoth, Lind & Ponack, L.L.P.

(57) ABSTRACT

A hinge assembly includes a mounting body to be secured on a furniture carcass, a furniture hinge which has two fitting parts interconnected via at least one joint axle, and a locking device, by which one of the fitting parts of the furniture hinge can be locked to the mounting body. The fitting part of the furniture hinge that is to be locked on the mounting body has three plates which are arranged one above the other and are interconnected at least by at least one common, pin-like retaining part.

27 Claims, 3 Drawing Sheets

(51) Int. Cl.
*E05D 5/06* (2006.01)
*E05F 3/20* (2006.01)

(56) References Cited

U.S. PATENT DOCUMENTS

| | | | | | |
|---|---|---|---|---|---|
| 5,056,189 | A * | 10/1991 | Brustle | E05D 7/0407 | 16/DIG. 43 |
| 5,105,506 | A * | 4/1992 | Lin | E05D 7/0407 | 16/DIG. 43 |
| 5,210,907 | A * | 5/1993 | Toyama | E05D 7/125 | 16/DIG. 43 |
| 5,253,390 | A * | 10/1993 | Gross | E05D 7/125 | 16/257 |
| 5,276,944 | A * | 1/1994 | Lin | E05D 7/0407 | 16/DIG. 43 |
| 5,444,895 | A * | 8/1995 | Salice | E05D 11/1021 | 16/245 |
| 5,819,371 | A * | 10/1998 | Rock | E05D 7/123 | 16/382 |
| 5,964,010 | A * | 10/1999 | Huber | E05D 7/0407 | 16/242 |
| 6,032,333 | A * | 3/2000 | Brustle | E05D 7/0407 | 16/245 |
| 6,266,848 | B1 * | 7/2001 | Fraccaro | E05D 7/0407 | 16/241 |
| 6,647,591 | B1 * | 11/2003 | Domenig | E05D 7/0415 | 16/242 |
| 6,810,563 | B1 * | 11/2004 | Domenig | E05D 7/0423 | 16/236 |
| 6,845,544 | B2 * | 1/2005 | Hofer | E05D 7/0423 | 16/245 |
| 6,883,204 | B2 * | 4/2005 | Salice | E05D 7/0415 | 16/382 |
| 6,918,158 | B2 * | 7/2005 | Isele | E05D 7/0415 | 16/242 |
| 6,925,682 | B2 * | 8/2005 | Mueller | E05D 7/0407 | 16/236 |
| 6,971,142 | B2 * | 12/2005 | Lautenschlager | E05D 5/0276 | 16/382 |
| 6,996,877 | B2 * | 2/2006 | Booker | E05D 7/0407 | 16/382 |
| 7,017,231 | B2 * | 3/2006 | Isele | E05D 7/0407 | 16/382 |
| 7,117,561 | B1 * | 10/2006 | Domenig | E05D 7/0407 | 16/236 |
| 7,213,300 | B1 * | 5/2007 | Domenig | E05D 7/04 | 16/236 |
| 7,231,691 | B1 * | 6/2007 | Domenig | E05D 7/0415 | 16/236 |
| 7,509,708 | B1 * | 3/2009 | Radke | E05D 7/081 | 16/245 |
| 7,516,516 | B2 * | 4/2009 | Wu | E05D 7/0415 | 16/382 |
| 7,591,044 | B2 * | 9/2009 | Migli | E05D 9/00 | 16/242 |
| 7,594,300 | B2 * | 9/2009 | Nallamottu | E05D 7/0407 | 16/236 |
| 7,698,782 | B2 * | 4/2010 | Lautenschlager | E05D 5/065 | 16/236 |
| 8,205,298 | B2 * | 6/2012 | Lin | E05F 5/006 | 16/245 |
| 8,276,241 | B2 * | 10/2012 | Wu | E05D 7/0415 | 16/382 |
| 8,689,402 | B2 * | 4/2014 | Brunnmayr | E05D 3/02 | 16/296 |
| 8,839,488 | B2 * | 9/2014 | Lowe | E05D 5/08 | 16/236 |
| 8,881,346 | B2 * | 11/2014 | Oshima | E05D 7/125 | 16/382 |
| 8,904,599 | B2 * | 12/2014 | Migli | E05D 5/065 | 16/382 |
| 9,169,681 | B2 * | 10/2015 | Cooper | E05D 3/14 | |
| 9,217,268 | B2 * | 12/2015 | Lautenschlager | E05D 7/0415 | |
| 9,316,035 | B2 * | 4/2016 | Ng | E05D 7/0407 | |
| 9,328,545 | B1 * | 5/2016 | Ng | E05D 7/0415 | |
| 9,347,248 | B2 * | 5/2016 | Ng | E05D 7/0407 | |
| 9,366,067 | B2 * | 6/2016 | Wu | E05D 7/0415 | |
| 9,376,847 | B2 * | 6/2016 | Salice | E05D 7/0407 | |
| 9,388,616 | B2 * | 7/2016 | Cooper | E05D 5/065 | |
| 9,416,575 | B2 * | 8/2016 | Peer | E05D 3/02 | |
| 9,464,472 | B2 * | 10/2016 | Ng | E05D 7/0415 | |
| 9,565,941 | B2 * | 2/2017 | Peer | E05D 7/0415 | |
| 9,664,215 | B2 * | 5/2017 | Laird | E05D 5/08 | |
| 9,874,049 | B1 * | 1/2018 | McGregor | E05D 5/065 | |
| 10,030,427 | B2 * | 7/2018 | McGregor | E05D 11/10 | |
| 10,233,684 | B2 * | 3/2019 | Pyo | E05D 7/0009 | |
| 10,240,377 | B2 * | 3/2019 | Arai | E05D 7/125 | |
| 10,415,292 | B2 | 9/2019 | Hammerer | | |
| 10,626,645 | B2 * | 4/2020 | Koshikawa | F16C 11/10 | |
| 11,111,711 | B2 * | 9/2021 | Capur | E05D 5/0215 | |
| D932,279 | S * | 10/2021 | Ruecker | D8/323 | |
| 11,149,481 | B2 * | 10/2021 | Tanriverdi | E05D 7/123 | |
| 11,466,493 | B2 * | 10/2022 | Capur | E05D 5/065 | |
| 11,808,071 | B2 * | 11/2023 | Cai | E05D 5/065 | |
| 2004/0163211 | A1 * | 8/2004 | Rucker | E05D 7/0415 | 16/235 |
| 2004/0216272 | A1 * | 11/2004 | Booker | E05D 7/123 | 16/255 |
| 2005/0144758 | A1 * | 7/2005 | Herper | E05D 5/0276 | 16/277 |
| 2006/0137139 | A1 * | 6/2006 | Wu | E05D 7/0423 | 16/236 |
| 2008/0209677 | A1 * | 9/2008 | Herper | E05D 7/0407 | 16/233 |
| 2014/0359973 | A1 * | 12/2014 | Ng | E05D 7/00 | 16/225 |
| 2015/0330128 | A1 * | 11/2015 | Ng | E05D 3/16 | 16/65 |
| 2016/0032636 | A1 * | 2/2016 | Dai | E05F 5/006 | 16/65 |
| 2017/0254128 | A1 * | 9/2017 | Ng | E05D 3/02 | |
| 2018/0209193 | A1 | 7/2018 | Hammerer | | |
| 2019/0390492 | A1 | 12/2019 | Capur et al. | | |
| 2021/0148147 | A1 * | 5/2021 | Capur | E05D 7/0423 | |
| 2021/0372179 | A1 * | 12/2021 | Cai | E05D 7/0407 | |
| 2022/0349227 | A1 * | 11/2022 | Gstrein | E05D 3/02 | |
| 2022/0349229 | A1 * | 11/2022 | Gstrein | E05D 7/0415 | |

FOREIGN PATENT DOCUMENTS

| | | |
|---|---|---|
| DE | 85 30 987.7 | 4/1987 |
| EP | 0 982 455 | 8/1999 |
| JP | 6-29414 | 8/1994 |
| JP | 8-7000 | 2/1996 |
| JP | 10-37573 | 2/1998 |
| JP | 3405887 | 3/2003 |
| WO | 2018/147818 | 8/2018 |
| WO | 2020/005174 | 1/2020 |

* cited by examiner

HINGE ASSEMBLY

BACKGROUND OF THE INVENTION

The present invention relates to a hinge assembly including an installing body to be fastened on a furniture carcass, in particular on a frame of the furniture carcass, a furniture hinge which has two fittings connected to one another via at least one, in particular precisely one, hinge pin, and a locking device with which one of the fittings of the furniture hinge can be locked, in particular releasably, to the installing body.

Such hinge assemblies are already known from the state of the art. It is also already known that the position of the two fittings relative to one another is settable. However, technically complex setting devices are used for this, which require a large installation space and make the furniture hinge unstable.

SUMMARY OF THE INVENTION

The object of the present invention is to at least partially remedy these disadvantages and to provide a hinge assembly which is improved compared with the state of the art and which creates the prerequisite for a convenient setting of the position of the two fittings relative to one another, and is characterized by a compact construction and at the same time a high stability.

According to the invention, the fitting of the furniture hinge to be locked on the installing body has three panels arranged one over another, which are connected to one another at least by at least one common pin-shaped retaining part.

Because three panels arranged one over another are provided, various possible settings can be implemented by setting in each case two of the three panels relative to one another.

Because the three panels are connected to one another by at least one common pin-shaped retaining part, a compact and very stable construction is possible.

According to a preferred embodiment, a first of the three panels faces the installing body in a locked position, a third of the three panels adopts an outer position, and a second of the three panels adopts a middle position between the first of the three panels and the third of the three panels.

In this connection, it has proved to be advantageous that a setting device for height adjustment is provided, by which the second of the three panels is displaceable relative to the first of the three panels.

The second of the three panels can be displaceable relative to the first of the three panels in a direction parallel to the at least one hinge pin, and/or the setting device for height adjustment has a rotatably mounted setting wheel, preferably wherein the setting wheel is rotatably connected to the first of the three panels via a mounting point and is supported on the second of the three panels, and/or the third of the three panels is displaceable relative to the first of the three panels synchronously with the second of the three panels through the setting device for height adjustment.

As an alternative or supplement, a setting device for lateral adjustment is provided, by which the second of the three panels is pivotable relative to the first of the three panels.

In this connection, it is appropriate that the second of the three panels is pivotable relative to the first of the three panels about the at least one common pin-shaped retaining part, and/or the setting device for lateral adjustment has a setting screw, which is supported with its lower end on a mounting point of the first of the three panels and is provided with an external thread, which cooperates with an internal thread of the second of the three panels, and/or the third of the three panels is pivotable relative to the first of the three panels synchronously with the second of the three panels through the setting device for lateral adjustment.

It has also proved to be favorable that a setting device for depth adjustment is provided, by which the third of the three panels is displaceable relative to the second of the three panels.

The third of the three panels can be displaceable relative to the second of the three panels in a direction transverse to the at least one hinge pin, and/or the setting device for depth adjustment has a rotatably mounted setting wheel, preferably wherein the setting wheel is rotatably connected to the second of the three panels via a mounting point and is supported on the third of the three panels, and/or the first of the three panels is displaceable relative to the third of the three panels synchronously with the second of the three panels through the setting device for depth adjustment, and/or the third of the three panels has at least one stop, preferably in the form of an embossment, for limiting a movement of the second of the three panels.

An advantageous embodiment is characterized in that at least one of the three panels, preferably all three of the three panels, is formed U-shaped in cross section at least in regions, preferably wherein the U shape is open in the direction towards the installing body, and/or has at least two side bars spaced apart from one another.

It has proved to be favorable that the at least one common pin-shaped retaining part is displaceably mounted in at least one oblong hole, preferably open to one side, in the third of the three panels, and/or is mounted in at least one, preferably circular, opening in the second of the three panels, and/or is mounted in at least one, preferably circular, opening in the first of the three panels.

With regard to the locking device, it has proved to be advantageous that the at least one retaining part represents a part of the locking device and has an outer contour, and that the locking device has a locking contour corresponding to the outer contour of the at least one retaining part, wherein the locking contour has at least one first part which is formed stationary and at least one second part that is movable, preferably pivotable, relative to the first part, wherein in a locked position the at least one retaining part is received between the two parts of the locking contour.

In other words, the locking contour is designed at least in two parts and comprises a stationary first part and at least one second part that is movable relative to the first part, wherein in the locked position the first and the second part of the locking contour surround the retaining part to be fastened. In the locked position the retaining part is thus held both in a friction-locking manner and in a positive-locking manner by the first and second parts of the locking contour.

This has the particular advantage that the retaining part, when the movable second part of the locking contour is actuated, continues to be held in position in a positive-locking manner by the stationary first part of the locking contour, without the retaining part performing a movement relative to the first part of the locking contour. The components to be locked (i.e. the installing body and the retaining part of a fitting) are separable from one another only by a releasing movement carried out intentionally. This represents a safety aspect because the danger of an unintentional release of the locking device and a fall of the furniture part is significantly reduced.

In this connection, it is appropriate that both parts of the locking contour are arranged on the installing body and the at least one retaining part is arranged on the fitting of the furniture hinge to be locked, and/or the outer contour of the at least one retaining part is formed cylindrical at least in regions, and/or the at least one stationary first part of the locking contour is formed on a hook element, preferably wherein the first part of the locking contour is open in the direction of the fitting, which is connected to the fitting to be locked via the at least one hinge pin, and/or the at least one stationary first part of the locking contour has a concave, preferably semi-circular, portion in cross section, and/or the two parts of the locking contour together form a three-quarter circle in cross section, and/or are arranged offset relative to one another in a direction parallel to the at least one hinge pin, and/or the locking contour has at least two stationary first parts, which are spaced apart from one another in a direction parallel to the at least one hinge pin, wherein the at least one second part of the locking contour is arranged between the at least two stationary first parts.

Because the two parts of the locking contour together form a three-quarter circle in cross section, and/or are arranged offset relative to one another in a direction parallel to the at least one hinge pin, a stable and particularly tilt-proof connection between the installing body and the retaining part results.

It has proved to be advantageous that the at least one second part of the locking contour is formed on a lever, preferably wherein at one end the lever is mounted rotatable about a pivot pin, and/or a spring element, preferably a leg spring or leaf spring, is provided which applies a force to the lever in the direction of the locked position, and/or the lever has a free end on which the second part of the locking contour is arranged, and/or the lever has a free end on which an actuating element for manually unlocking the locking device is arranged.

As an alternative or supplement, according to advantageous embodiments it can be provided that the locking device comprises at least one further retaining part, wherein the two retaining parts of the locking device are spaced apart from one another in a direction transverse to the at least one hinge pin, preferably wherein the two retaining parts of the locking device in each case have a longitudinal direction, wherein the longitudinal directions of the two retaining parts run substantially parallel to one another, and/or the at least one further retaining part is formed as a cylindrical bolt, preferably wherein the fitting of the furniture hinge to be locked has at least two side bars spaced apart from one another, between which the cylindrical bolt is arranged.

At least one receiving device can be provided, in which the at least one further retaining part can be arranged, preferably wherein the at least one receiving device is open in the direction of the fitting, which is connected to the fitting to be locked via the at least one hinge pin, and/or the two retaining parts of the locking device can be arranged in the locking contour and in the at least one receiving device through a single common, preferably translational, joining movement.

It has proved to be particularly advantageous that the fitting, which is connected to the fitting to be locked via the at least one hinge pin, is formed as a hinge cup, preferably wherein a damping device for damping a movement of the two fittings of the furniture hinge relative to one another is arranged in a cavity of the hinge cup, particularly preferably wherein a damping power of the damping device is settable, preferably by a switch.

BRIEF DESCRIPTION OF THE DRAWINGS

Further details and advantages of the present invention arise from the following description of the figures.

DETAILED DESCRIPTION OF THE INVENTION

Figure 1:
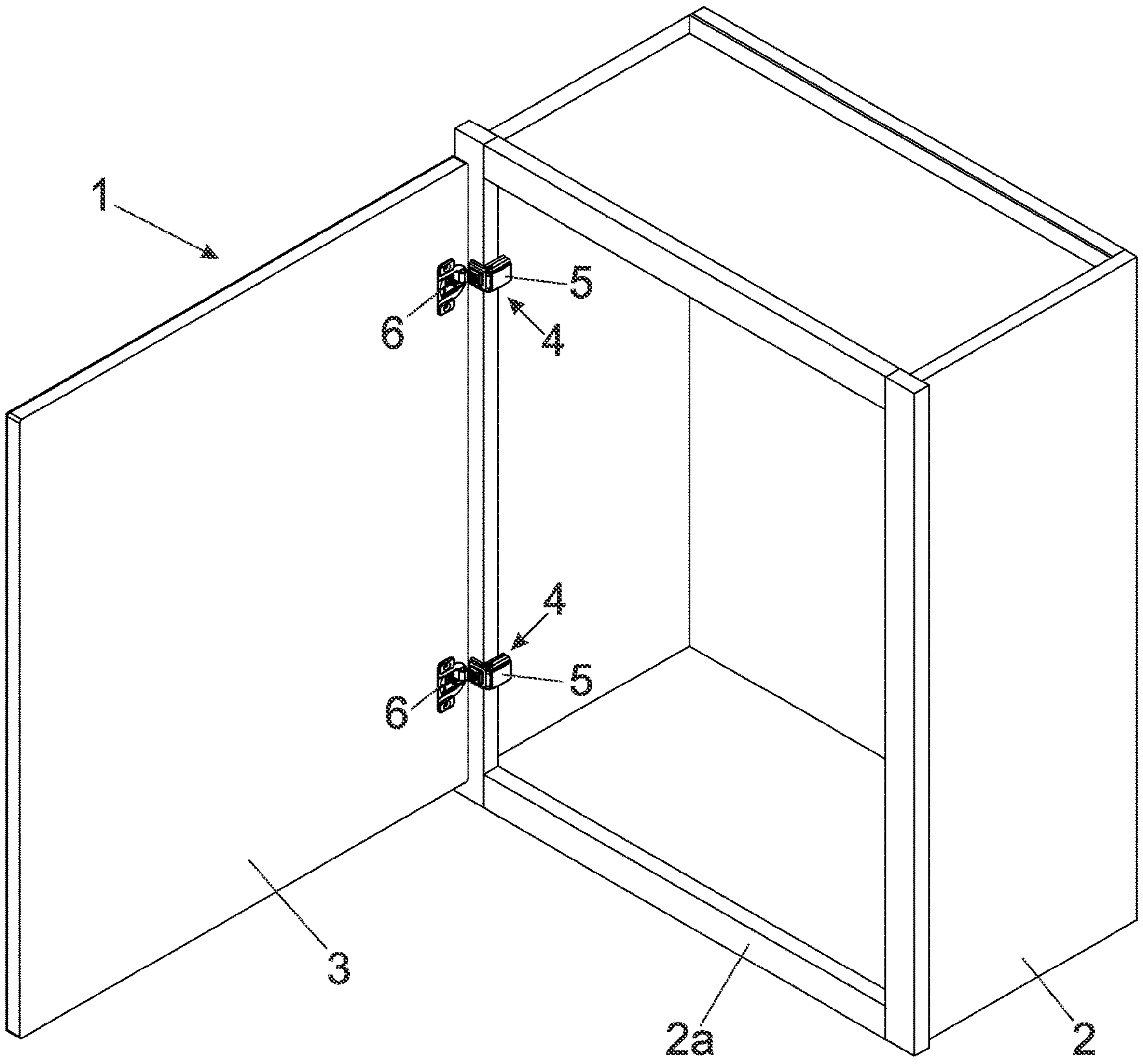
FIG. 1 shows a perspective view of a piece of furniture with a furniture carcass and a furniture part mounted movable relative to the furniture carcass.

FIG. 1 shows a perspective view of a piece of furniture 1 with a furniture carcass 2 and a furniture part 3, which is mounted pivotable relative to the furniture carcass 2 by two or more furniture hinges 4. The furniture hinges 4 have two fittings 5, 6 connected to one another in an articulated manner, wherein a first fitting 5 of the furniture hinge 4 is to be fastened on the furniture carcass 2 and a second fitting 6 of the furniture hinge 4 is to be fastened on the movable furniture part 3.

In the embodiment example shown, the furniture hinges 4 are formed as so-called frame hinges. The first fitting 5 of the furniture hinge 4 can be designed as a hinge arm 5*a*, which is to be fastened on a frame 2*a* of the furniture carcass 2.

Figure 2:
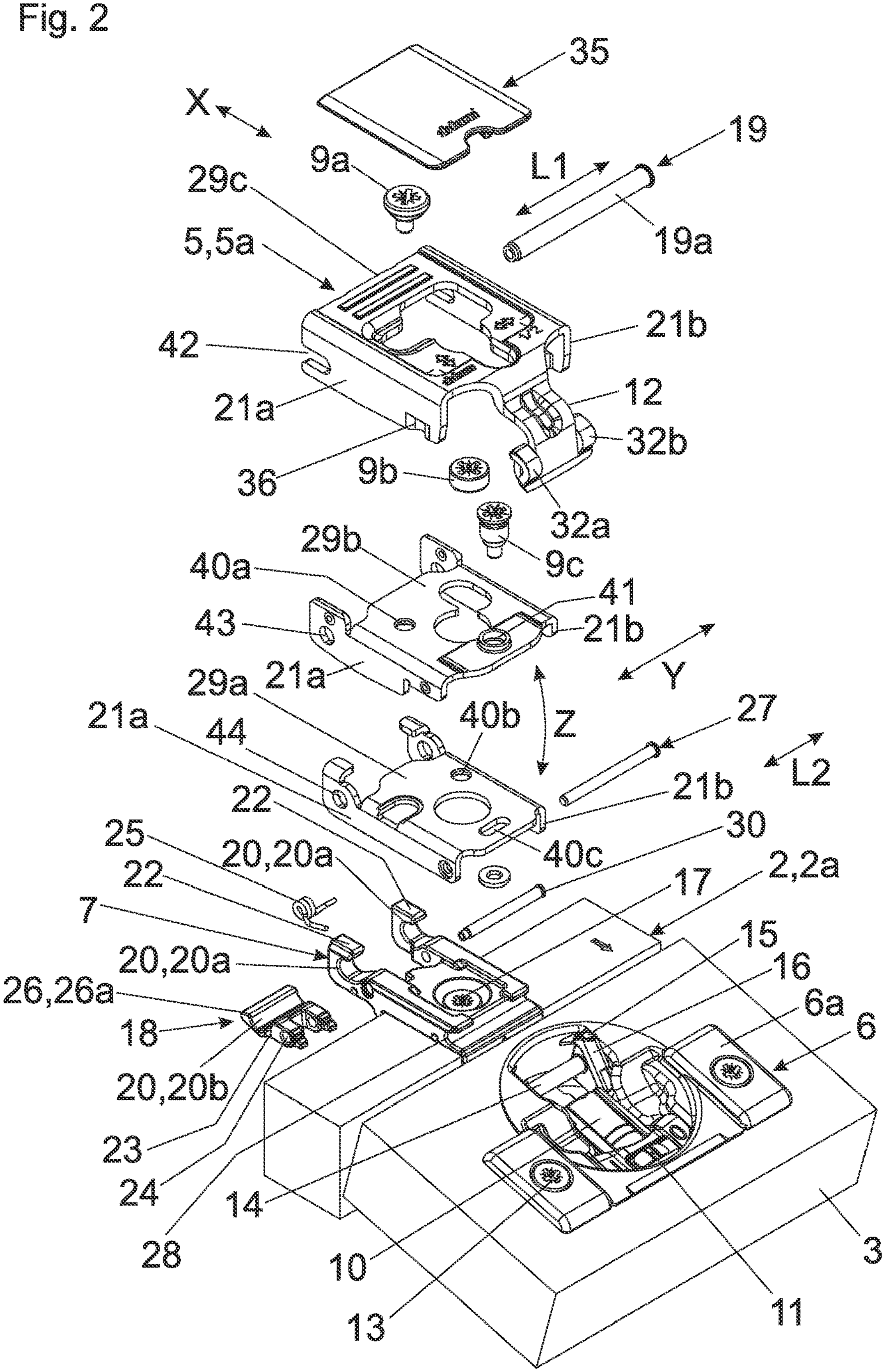
FIG. 2 shows an embodiment example of a hinge assembly in an exploded representation.

FIG. 2 shows an embodiment example of a hinge assembly in an exploded representation.

The first fitting 5 in the form of the hinge arm 5*a* is to be fastened on the furniture carcass 2 via an installing body 7, wherein in a first installation step the installing body 7 is to be fastened on the furniture carcass 2, preferably on the frame 2*a*. In a subsequent installation step the first fitting 5 can be locked toollessly to the installing body 7 pre-installed on the furniture carcass 2 and can be unlocked toollessly.

A position of the furniture part 3 in an installed state on the furniture carcass 2 is settable by at least one or more setting devices 9*a*, 9*b*, 9*c*. It is preferably provided that three setting devices 9*a*, 9*b*, 9*c* are provided, by which a three-dimensional setting of the furniture part 3 relative to the furniture carcass 2 can be made possible. A depth setting of the movable furniture part 3 can be brought about by the first setting device 9*a*, a height setting can be brought about by the second setting device 9*b* and a lateral setting can be brought about by the third setting device 9*c*. At least one, preferably all, of the setting devices 9*a*, 9*b*, 9*b* have a rotatably mounted setting wheel (for example an eccentric, a spiral disk or a setting screw).

The second fitting 6 of the furniture hinge 4 can be designed as a hinge cup 6*a*, which is pivotably connected to the first fitting 5 via at least one hinge pin 14, preferably precisely one hinge pin 14. The hinge cup 6*a* has a cavity 6*b*, in which a damping device 10 for damping a movement of the two fittings 5, 6 of the furniture hinge 4 relative to one another is arranged. The damping device 10 can comprise at least one, preferably hydraulic, piston-cylinder unit, which can be loaded by a pivotable articulated lever 12 of the furniture hinge 4 in the case of a predefined relative position of the fittings 5, 6 relative to one another. A damping power of the damping device 10 can be limited or deactivated by a movably mounted switch 11 with at least two switch positions.

The hinge cup 6*a* is to be sunk in a drilled hole in the movable furniture part 3, wherein the hinge cup 6*a* is to be fastened on the movable furniture part 3 by at least one fastening means 13 (for example by a screw or at least one expansion part).

The furniture hinge 4 has a spring device 15, by which the second fitting 6 is movable into a closed and/or into an open end position relative to the first fitting 5. In the embodiment example shown, the spring device 15 is designed as a leg spring, wherein the two ends of the leg spring in each case have a plastic sheath 16. The plastic sheaths 16 in each case rest against a control curve 32*a*, 32*b* of the first fitting 5 in an assembled state of the furniture hinge 4, whereby the friction is reduced and the fittings 5, 6 are movable relative to one another smoothly and practically without generating noise.

The installing body 7 is to be fastened on the furniture carcass 2, preferably on the frame 2*a*, for example via at least one screw 17. The installing body 7 has at least two protrusions 34*a*, 34*b*, which can be attached to opposite sides of the frame 2*a* for improved pre-positioning of the installing body 7.

The first fitting 5 can be releasably locked to the installing body 7 by a locking device 18. The locking device 18 comprises at least one retaining part 19 with a, preferably cylindrical, outer contour 19*a* and a locking contour 20 corresponding thereto, wherein the locking contour 20 has at least one first part 20*a* which is formed stationary and at least one second part 20*b* that is movable, preferably pivotable, relative to the first part 20*a*, wherein in a locked position the at least one retaining part 19 is received between the two parts 20*a*, 20*b* of the locking contour 20.

The at least one retaining part 19 can be formed in a simple manner as a cylindrical pin. The fitting 5 to be locked can have at least two side bars 21*a*, 21*b* spaced apart from one another, between which the cylindrical pin is arranged.

The movable second part 20*b* of the locking contour 20 is pretensioned by a spring element 25, preferably a leg spring or leaf spring, which applies a force to the second part 20*b* of the locking contour 20 in the direction of the locked position. The movable second part 20*b* of the locking contour 20 is mounted rotatable about a bolt 30, which forms the pivot pin 24 for the movable second part 20*b* of the locking contour 20.

The fitting 5 of the furniture hinge 4 to be locked on the installing body 7 can have at least two, preferably precisely three, panels 29*a*, 29*b*, 29*c* arranged one over another. The at least two panels 29*a*, 29*b*, 29*c* are displaceable relative to one another and/or pivotable relative to one another through at least one setting device 9*a*, 9*b*, 9*c*.

In the embodiment example shown, the setting devices 9*a*, 9*b*, 9*c* in each case have an eccentric. The eccentric of the first setting device 9*a* is rotatably connected (preferably by orbital riveting) to the second panel 29*b* via the mounting point 40*a* and is supported on the third panel 29*c* with its eccentric control contour.

The eccentric of the second setting device 9*b* is rotatably connected (preferably by orbital riveting) to the first panel 29*a* via the mounting point 40*b* and is supported on the second panel 29*b* with its eccentric control contour.

Of course, it is also possible for the setting devices 9*a*, 9*b*, 9*c* also to have, instead of the eccentric, a worm gear or a rotatable spiral disk, which cooperates with protrusions of the component to be set spaced apart from one another.

The articulated lever 12 is integrally connected to the third panel 29*c* of the first fitting 5. At least one setting wheel, preferably at least two setting wheels, of the setting devices 9*a*, 9*b*, 9*c* can be covered by a, preferably substantially rectangular, cover 35.

The locking device 18 can comprise at least one further retaining part 27, wherein the two retaining parts 19, 27 of the locking device 18 are spaced apart from one another in a direction transverse to the at least one hinge pin 14, wherein it is preferably provided that

- the two retaining parts 19, 27 of the locking device 18 in each case have a longitudinal direction L1, L2, wherein the longitudinal directions L1, L2 of the two retaining parts 19, 27 run substantially parallel to one another, and/or
- the at least one further retaining part 27 is formed as a cylindrical bolt, preferably wherein the fitting 5, 6 of the furniture hinge 4 to be locked has at least two side bars 21*a*, 21*b* spaced apart from one another, between which the cylindrical bolt is arranged.

The at least one stationary first part 20*a* of the locking contour 20 can be formed on a hook element 22. It is preferably provided that the first part 20*a* of the locking contour 20 is open in the direction of the fitting 6, which is connected to the fitting 5 to be locked via the at least one hinge pin 14. It can be seen that the at least one stationary first part 20*a* of the locking contour 20 has a concave, preferably approximately semi-circular, portion in cross section.

In the embodiment example shown, the locking contour 20 has at least two stationary first parts 20*a*, which are spaced apart from one another in a direction parallel to the at least one hinge pin 14, wherein the at least one second part 20*b* of the locking contour 20 is arranged between the at least two stationary first parts 20*a* of the locking contour 20.

The at least one second part 20*b* of the locking contour 20 can be formed on a lever 23. It is preferably provided:

- that at one end the lever 23 is mounted rotatable about a pivot pin 24, and/or
- that a spring element 25, preferably a leg spring or leaf spring, is provided which applies a force to the lever 23 in the direction of the locked position, and/or
- that the lever 23 has a free end 26 on which the second part 20*b* of the locking contour 20 is arranged, and/or
- that the lever 23 has a free end 26 on which an actuating element 26*a* for manually unlocking the locking device 18 is arranged.

The second panel 29*b* can be inserted from behind, i.e. in the X direction, between the side bars 21*a*, 21*b* of the third panel 29*c*, wherein the third panel 29*c* has a stop 36 pointing inwards, preferably in the form of an embossment, for limiting a movement of the second panel 29*b*. The eccentric of the first setting device 9*a* is rotatably connected to the second panel 29*b* via the mounting point 40*a* and is supported on the third panel 29*c* with its eccentric control contour. The third panel 29*c* can be set relative to the second panel 29*b* in the X direction by actuating the first setting device 9*a*.

The eccentric of the second setting device 9*b* is rotatably connected to the first panel 29*a* via the mounting point 40*b* and is supported on the second panel 29*b* with its eccentric control contour. The panels 29*b*, 29*c* can together be set relative to the first panel 29*a* in the Y direction by actuating the second setting device 9*b*.

In the embodiment example shown, the third setting device 9*c* has a setting screw, which is supported with its lower end on the mounting point 40*c* of the first panel 29*a*. The setting screw of the third setting device 9*c* is provided with an external thread, which cooperates with an internal thread 41 of the second panel 29*b*. The second panel 29*b* is pivotable relative to the first panel 29*a* about the pin-shaped retaining part 19 in the Z direction by actuating the third setting device 9*c*.

The two stationary first parts 20*a* of the locking contour 20 are in each case formed on a hook element 22, wherein the movable second part 20*b* of the locking contour 20 is arranged between the two first parts 20*a* of the locking contour 20. The movable second part 20*b* is mounted pivotable about the bolt 30, which forms the pivot pin 24 for the second part 20*b*. It is preferably provided that the direction of the at least one hinge pin 14 and the direction of the pivot pin 24 run parallel to one another.

It should be noted that in an assembled and in an installed state of the furniture hinge 4 on the furniture carcass 2 the screw 17, by which the installing body 7 is fastened on the furniture carcass 2, is always to be actuated using a tool, preferably a screwdriver. For this, the recesses in the panels 29*a*, 29*b*, 29*c* are to be arranged such that an insertion of the tool and a rotational movement of the screw 17 by means of the tool are possible in all operating positions of the furniture hinge 4.

FIGS. 3*a*-3*d* show the process for installing the first fitting 5 of the furniture hinge 4 on the installing body 7. The installing body 7 is to be fastened on the furniture carcass 2, in particular on the frame 2*a* of the furniture carcass 2, via the screw 17 in a first installation step. An improved pre-positioning of the installing body 7 relative to the frame 2*a* of the furniture carcass 2 is made possible by the protrusions 34*a*, 34*b*.

The first fitting 5 comprises the two retaining parts 19, 27 spaced apart from one another, which have a cylindrical outer contour in the embodiment example shown. The two retaining parts 19, 27 are spaced apart from one another in a direction transverse to the at least one hinge pin 14 and in each case have a longitudinal direction L1, L2, which run substantially parallel to one another.

The installing body 7 is provided with the locking contour 20, which has the two stationary first parts 20*a* and the movable second part 20*b*. The second part 20*b* is mounted movable between the two stationary parts 20*a*. The locking contour 20 of the installing body 7 can be releasably locked to the retaining part 19 of the fitting 5. The installing body 7 additionally has a receiving device 28 for receiving the further retaining part 27 of the first fitting 5.

Figure 3A:
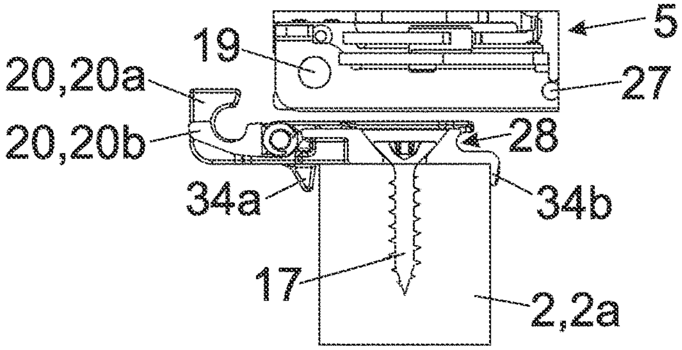
FIGS. 3*a*-3*d* show cross-sectional views of the process for installing the first fitting on the installing body.
Figure 3B:
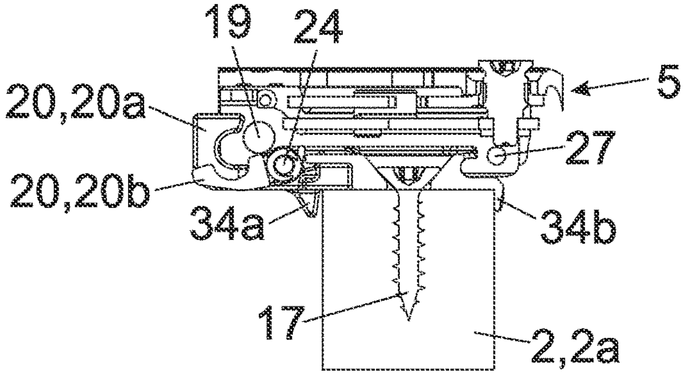

Starting from the position according to FIG. 3*a*, the fitting 5 is placed on the installing body 7 and moved in the direction of the joining movement. Through the movement of the fitting 5 in the direction of the joining movement, the second part 20*b* of the locking contour 20 is moved about the pivot pin 24 against a force of the spring element 25 (FIG. 3*b*).

Figure 3C:
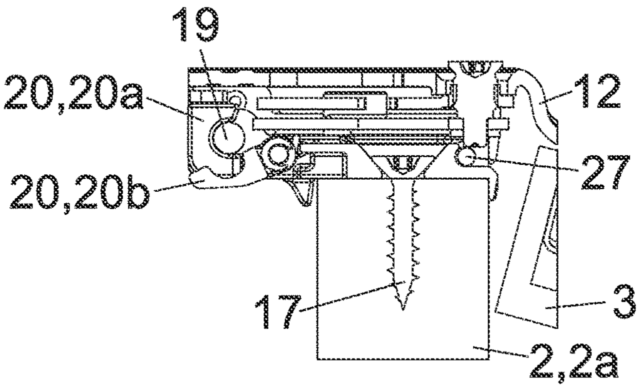
Figure 3D:
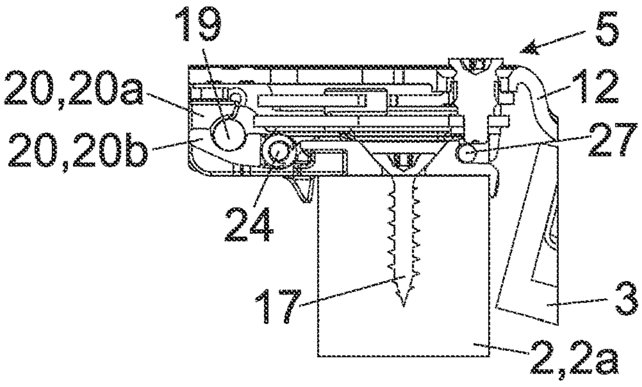

The two retaining parts 19, 27 can be arranged in the locking contour 20 and in the at least one receiving device 28 through a single common, preferably translational, joining movement (FIG. 3*c*). Through a continued movement of the fitting 5 in the direction of the joining movement, the second part 20*b* of the locking contour 20 snaps back due to a force of the spring element 25 and thereby locks the retaining part 19 in a friction-locking and in a positive-locking manner. The two parts 20*a*, 20*b* of the locking contour 20 together form a three-quarter circle in cross section and/or are arranged offset relative to one another in a direction parallel to the at least one hinge pin 14.

The locking between the installing body 7 and the fitting 5 is releasable again through the exertion of force on the second part 20*b* of the locking contour 20 against a force of the spring element 25. The exertion of force on the second part 20*b* for releasing the locking can be effected for example manually, i.e. without the use of a tool. Alternatively, a tool can also be used for the exertion of force on the second part 20*b* for releasing the locking between the installing body 7 and the fitting 5.

The invention claimed is:

1. A hinge assembly comprising:
an installing body to be fastened on a furniture carcass,
a furniture hinge which has a first fitting and a second fitting connected to one another via at least one hinge pin; and
a lock with which the first fitting of the furniture hinge is configured to be releasably locked, to the installing body,
wherein the fitting which is releasably lockable to the installing body has three panels arranged one over another, which are connected to one another at least by a first pin-shaped retaining part;
wherein the first pin-shaped retaining part is a part of the lock and has an outer contour, and the lock has a locking contour corresponding to the outer contour of the first pin-shaped retaining part, wherein the locking contour has a first part which is stationary and a second part that is movable relative to the first part, wherein in a locked position the first pin-shaped retaining part is received between the first part and the second part of the locking contour; and
wherein the lock comprises a second pin-shaped retaining part, wherein the first and second pin-shaped retaining parts of the lock are spaced apart from one another in a direction transverse to the at least one hinge pin.

2. The hinge assembly according to claim 1, wherein a first of the three panels faces the installing body in a locked position, a third of the three panels is arranged at an outermost position of the three panels relative to the installing body, and a second of the three panels is arranged at a middle position between the first of the three panels and the third of the three panels.

3. The hinge assembly according to claim 2, wherein a setting device for height adjustment is provided, by which the second of the three panels is displaceable relative to the first of the three panels.

4. The hinge assembly according to claim 3, wherein:
the second of the three panels is displaceable relative to the first of the three panels in a direction parallel to the at least one hinge pin; or
the setting device for height adjustment has a rotatably mounted setting wheel; or
the third of the three panels is displaceable relative to the first of the three panels synchronously with the second of the three panels through the setting device for height adjustment.

5. The hinge assembly according to claim 2, wherein a setting device for lateral adjustment is provided, by which the second of the three panels is pivotable relative to the first of the three panels.

6. The hinge assembly according to claim 5, wherein:
the second of the three panels is pivotable relative to the first of the three panels about the first pin-shaped retaining part; or
the setting device for lateral adjustment has a setting screw, which is supported with its lower end on a mounting point of the first of the three panels and is provided with an external thread, which cooperates with an internal thread of the second of the three panels;

the third of the three panels is pivotable relative to the first of the three panels synchronously with the second of the three panels through the setting device for lateral adjustment.

7. The hinge assembly according to claim 2, wherein a setting device for depth adjustment is provided, by which the third of the three panels is displaceable relative to the second of the three panels.

8. The hinge assembly according to claim 7, wherein:

the third of the three panels is displaceable relative to the second of the three panels in a direction transverse to the at least one hinge pin; or the setting device for depth adjustment has a rotatably mounted setting wheel; or the first of the three panels is displaceable relative to the third of the three panels synchronously with the second of the three panels through the setting device for depth adjustment; or the third of the three panels has at least one stop for limiting a movement of the second of the three panels.

9. The hinge assembly according to claim 2, wherein at least one of the three panels:

is formed U-shaped in cross section at least in a portion thereof; or has at least two side bars spaced apart from one another.

10. The hinge assembly according to claim 1, wherein the first pin-shaped retaining part:

is displaceably mounted in at least one oblong hole in the third of the three panels; or is mounted in at least one opening in the second of the three panels; or is mounted in at least one opening in the first of the three panels.

11. The hinge assembly according to claim 1, wherein:

the first and second parts of the locking contour are both arranged on the installing body, and the first pin-shaped retaining part is arranged on the first fitting of the furniture hinge; or at least a portion of the outer contour of the first pin-shaped retaining part is cylindrical; or the first part of the locking contour is formed on a hook element; or the first part of the locking contour has a concave portion in cross section; or the first and second parts of the locking contour together form a three-quarter circle in cross section, or are arranged offset relative to one another in a direction parallel to the at least one hinge pin; or the first part of the locking contour is one of two stationary first parts which are spaced apart from one another in a direction parallel to the at least one hinge pin, and wherein the second part of the locking contour is arranged between the two stationary first parts.

12. The hinge assembly according to claim 1, wherein the second part of the locking contour is formed on a lever.

13. The hinge assembly according to claim 1, further comprising at least one recess in which the second pin-shaped retaining part is arranged in the locked position.

14. The hinge assembly according to claim 1, wherein the second fitting of the furniture hinge is formed as a hinge cup.

15. The hinge assembly according to claim 1, wherein the installing body is configured to be fastened on a frame of the furniture carcass, and the first and second fittings of the furniture hinge are connected to one another via precisely one hinge pin.

16. The hinge assembly according to claim 4, wherein:

the setting device for height adjustment has the rotatably mounted setting wheel, and wherein the setting wheel is rotatably connected to the first of the three panels via a mounting point and is supported on the second of the three panels.

17. The hinge assembly according to claim 8, wherein:

the setting device for depth adjustment has the rotatably mounted setting wheel, and wherein the setting wheel is rotatably connected to the second of the three panels via a mounting point and is supported on the third of the three panels; or the third of the three panels has the at least one stop in the form of an embossment for limiting the movement of the second of the three panels.

18. The hinge assembly according to claim 9, wherein all three of the three panels:

are each formed U-hsaped in cross section at least in a portion thereof, and wherein the U shape is open in a direction towards the installing body; or each have at least two side bars spaced apart from one another.

19. The hinge assembly according to claim 10, wehrein the first pin-shaped retaining part:

is displaceably mounted in the at least one obling hole in the third of the three panels, the at least one obling hole being open to one side; or is mounted in the at least one opening in the secoind of the three panesl, the at least one opening in the second of the three panesl being a circular opening; or is mounted in the at least one opening in the first of the three panels, the at least one opening in the first of the three panels being a circular opening.

20. The hinge assembly according to claim 1, wherein the second part of the locking contour is pivotable relative to the first part of the locking contour.

21. The hinge assembly according to claim 11, wherein:

the first part of the locking contour is formed on the hook element, and the first part of the locking contour is open in a direction of the second fitting of the furniture hinge; or the first part of the locking contour has the concave portion, and the concave portion is semi-circular in cross section.

22. The hine assembly according to claim 12, wherein:

the lever is mounted at one end so as to be rotatable about a pivot pin; or a spring is provided which applies a force to the lever in a direction of the locked position; or the lever has a free end on which the second part of the locking countour is arranged; or the lever has a free end on which an actuating element for manually unlocking the lock is arranged.

23. The hinge assembly according to claim 1, wherein:

the first and second pin-shaped retaining parts of the lock each have a respective longitudinal direction, and the respective longitudinal directions run substantially parallel to one another; or the second pin-shaped retaining part is formed as a cylindrical bolt.

24. The hinge assembly according to claiom 23, wherein the second pin-shaped retaining part is formed as the cylindrical bolt, and the first fitting of the furniture hinge has at least two side bars spaced apart form one another, between which the cylindrical bolt is arranged.

25. The hinge assembly according to claim 13, wherein:

the at least one recess is open in a direction of the second fitting of the furniture hinge; or the first and second pin-shaped retaining parts of the lock are configured to be respectively arranged in the locking contour and in the at least one recess through a single common joining movement.

26. The hinge assembly according to claim 14, wherein a damper for damping a movement of the first and second fittings of the furniture hinge relative to one another is arranged in a cavity of the hinge cup.

27. The hinge assembly according to claim 26, wherein a damping power of the damper is settable.

* * * * *